June 21, 1927.
C. SAGAR
1,632,922
TOWING AND HAULING DEVICE
Filed Dec. 15, 1926
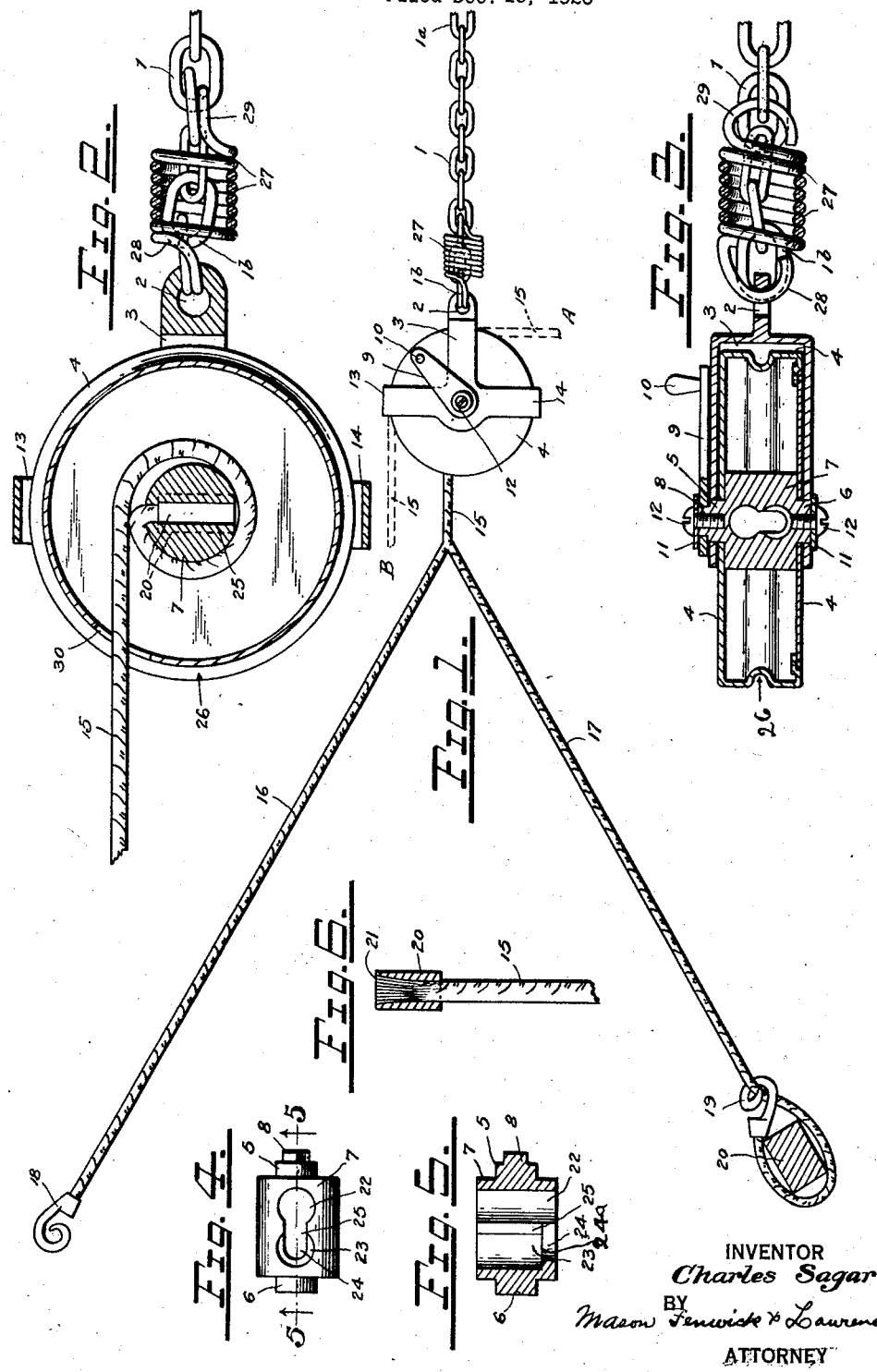
INVENTOR
Charles Sagar
BY
Mason Fenwick & Lawrence
ATTORNEY Patented June 21, 1927.

1,632,922

UNITED STATES PATENT OFFICE.

CHARLES SAGAR, OF SEATTLE, WASHINGTON.

TOWING AND HAULING DEVICE.

Application filed December 15, 1926. Serial No. 154,971.

This invention relates to towing devices, and particularly to a combination device for towing automobiles and for hauling the same onto a highway.

The object of the invention is to provide a combination device or machine which may be packed into a small space and easily carried and transported for ready use upon any automobile or other vehicle, and which may be used both for hauling the automobile from a ditch or outside the roadway back upon the travelled part of the road, and also for towing the automobile along the highway when damaged, or incapable of travelling under its own power.

A further object is to provide a sheave block of hollow construction, with a winding hub rotatably mounted across the center of the same, with a handle attached to the hub for turning it, a yoke extending from both ends of the hub outside of the block and terminating at a point beyond the periphery of the block with an eye in which is connected a front towing cable or chain, with a resilient member mounted in the chain for moderating shocks from obstacles in the roadway; the hub provided with holes at right angles, through which may be adjustably attached, or detached, a towing cable, extending from the hub out through a hole in the periphery of the block, and terminating in two short cables with attachment hooks for connecting with an automobile to be towed.

A further object is to provide a hollow block, with a groove or sheave depression about the center of its rim, with a rotatable hub across the center of the block and a towing cable which may be wound about the hub inside the block for transportation, or so the cable may be extended from the hub out through a hole in the block for attachment to an automobile to be towed, or so the cable may be detached from the hub and used as a cable over the groove whereby an automobile may be hauled from one side of the road upon the same, by power applied at right angles to the line of travel of the automobile, from the side of the road to the center thereof.

Figure 1 is a top plan of the device.
Figure 2 is a horizontal sectional view of parts thereof.
Figure 3 is a perpendicular view in section of parts thereof.
Figure 4 is a detail view of the hub member.
Figure 5 is a sectional view of the hub taken on lines 5, 5 of Figure 4.
Figure 6 is a detail enlarged of the cable knob.

Like numerals on the different figures represent like parts.

Numeral 1, is the front chain with the front links 1$^b$ broken away, and the links may be continued to such length as may be desired with a single, or double ends for attachment to any suitable towing automobile or tractor. The rear link 1$^c$, is attached through an eye 2 of a yoke 3 which extends back over and beyond the center of container block 4 and is revolvably mounted on and over shoulders 5 and 6 extending from the central winding and holding hub 7. A squared end 8, extends from the shoulder 5 on which is rigidly mounted a winding lever 9 with a handle 10, while washers 11, 11 and screws 12, 12, hold the yoke in position, with guide arms 13 and 14 integral with yoke 3 extending at right angles with the yoke over and around the block 4.

A towing cable 15 of any suitable length and preferably of twisted wires is adjustably connected and disconnected to the hub 7 as may be desired for towing or use over the block 4. The outer end of the cable is formed of two sections 16 and 17, with suitable quick connecting hooks 18 and 19 attached to the extremities thereof for attachment to an automobile to be towed, as shown by the section of frame or axle 20. A section of tubing or knob 20, is securely attached to the inner end 21, of the cable 15, by the spreading of the strands therein and addition of Babbitt metal, or other simple means. A hole 22 through which the knob 20 may easily slide is provided through the hub 7, and a similar hole 23 is provided into the hub parallel with hole 22 but a short distance therefrom, and of the depth equalling the length of the knob 20, said length being less than the diameter of the central part of the hub, while a smaller hole 24 of suitable size to freely carry the cable 15, extends from the base of the hole 23 to the opposite side of the hub 7, providing an abutment seat 24$^a$, and slot 25 of similar diameter with the hole 24 extends between the holes 22, 23 and 24.

The block 4 is provided with a groove or sheave 26 around its rim of sufficient size and depth to enable the cable 15 to operate thereover and under the yoke 3 and arms 13 and 14 which prevent the cable rolling out from the sheave when operated therein.

A helical spring 27 of suitable tension to break the shocks from obstructions that may be met by the automobile while being towed, is mounted over the chain 1 near the eye 2, with one end 28 of the spring member attached through the eye to the yoke 3, and the opposite end 29 of the spring is attached to the chain 1 through one of its links, at such a distance from the eye, that the links within the spring coils will be normally held in a slacked position while the spring is contracted, but as sufficient strain is thrown on the spring the coils thereof open and expand till the slack of the chain is taken up and the strain of pulling force will then be met and sustained by the chain so far as it exceeds the tension of the spring.

The dotted lines 15 in Figure 1, illustrate the use of the cable and block for hauling an automobile located at A extended as in a ditch by the roadside, and B, as the motive power attached to one end of the cable, the other end attached to the automobile in the ditch, the cable having been released from hub and passed over sheave and under the arms and yoke, and the chain 1 having been attached to a fixed post or anchor. Power applied at B pulls the automobile upon the roadway on which the power of B moves.

For affixing the cable to the hub for winding the same within the block, for transportation in small compass or for use in towing a disabled automobile, the operator turns the hub till the top of the hole 22 is in line with the opening hole 30 in the block, the knob 20 and end of cable being then pushed through the hole 22, the operator then moves the cable through the slot 25 into the small space 24, then pulls the cable and knob outward into hole 23 till the base of knob is seated on the abutment 24ª, and as the knob cannot move sidewise through the slot into the hole 22, the cable is secure against accidental loosening from the hub.

When it is necessary to remove the cable from the hub, the operator pushes the cable end and knob up through hole 23 until the knob is above the hub, then brings the cable across the slot 25, over the hole 22 and out through 22 and 30 until it is free for use over the sheave.

By having the hub rotatably mounted in the sheave block the cable, when not in use, will be securely housed within the sheave block, and when it is desired to use the cable, the same may be reeled out by means of winding lever 9.

What I claim is:

1. A combination towing and hauling device for drawing automobiles upon a roadway from one side thereof, and for towing automobiles along the roadway from power applied in one direction; with a hollow sheave block with a hub rotatably mounted across the center of the block, with a yoke rotatably mounted over the ends of the hub and extending outward to a point beyond the rim of the block, with a chain extending from the yoke for attachment to a moving power, with resilient means mounted over the chain and connected thereto at one end and the other end connected with the yoke, with a handle for turning the hub, and a towing cable adjustably attached at one end through the hub whereby the cable may be wound about the hub for transportation inside the block, or may be extended outward from the hub, with the outer end of the cable terminating in two points with attachment hooks thereon for connection with an automobile to be towed.

2. A combination device for hauling from the sides of a roadway to the center thereof and for hauling and towing the automobile along the center of the roadway; with a hollow sheave block and a rotatable hub mounted across and through the center thereof with means for turning the hub, and means extending from the ends of the hub for holding or moving the block, with a slotted hole through the hub at right angles therewith, with an abutment at one end of the hole for holding a towing cable, a towing cable with a knob fixed at one end thereof of suitable size to pass through a portion of the slotted hole, and too large to pass over the abutment, the knob and part of the adjoining cable passed through the larger portion of the slot and supported on the abutment, whereby the towing cable may be held adjustably to the hub for winding into the block over the hub, or extending out from the hub for towing purposes.

3. A combination hauling and towing device for moving automobiles, with a hollow sheave block and a rotatable hub mounted across the center thereof, with a yoke for connecting the ends of the hub to a chain for holding or moving the block, a helical spring mounted over links of the chain adjoining the yoke, with one end of the spring attached to the yoke, and the other end attached to a link in the chain at a distance from the yoke with the links of chain within the coils of the spring in a slackened position when the coils of the spring are contracted, and the said links in a tightened condition when the coils are expanded, with a towing cable adjustably connected with the hub.

4. A combination hauling and towing device for moving automobiles, with a hollow sheave block, and a rotatable hub mounted through the block from side to side, with means for connecting the ends of the hub with the moving power; a hole through the periphery of the block for the passage of a towing cable, the towing cable with a knob on one end and towing attachment on the other end, a slotted hole through the hub, with a portion of the hole of suitable size for the knob to be passed therethrough and the remainder of the slot of suitable size for the cable to pass therethrough, and an abutment around part of the orifice of one side of the hole between which the cable may be passed but the knob be held thereon, whereby the cable may be adjustably secured to hub for winding thereupon or for towing, or may be detached for use as a cable for hauling at right angles over the groove of the block.

In testimony whereof I affix my signature.

CHARLES SAGAR.